J. MECREDY & D. M. A. G. HAWES.
DESICCATING APPARATUS.
APPLICATION FILED JAN. 15, 1907.
915,303.
Patented Mar. 16, 1909.
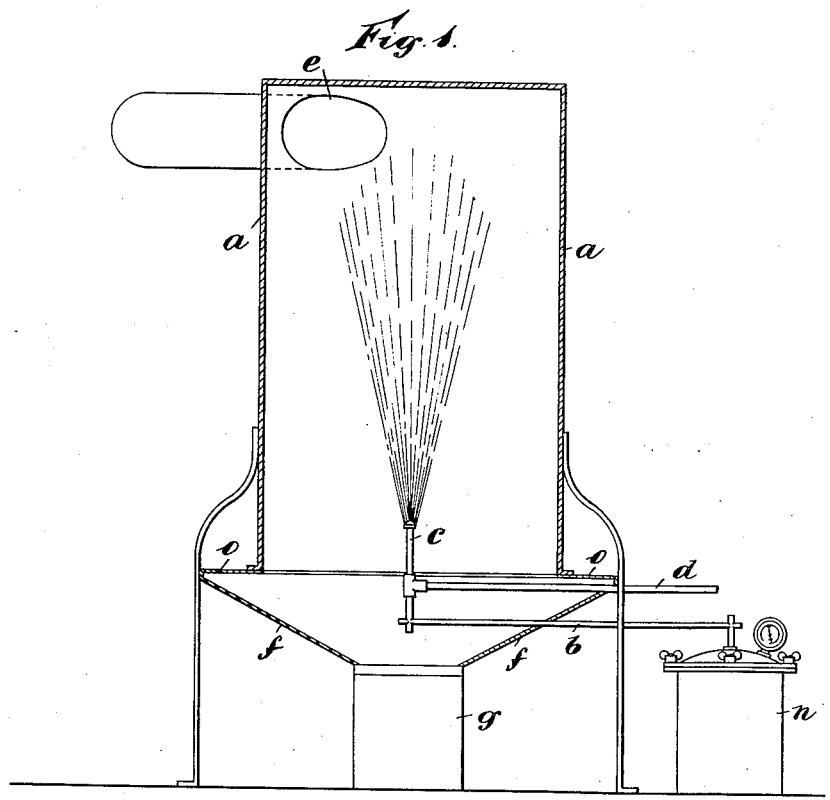
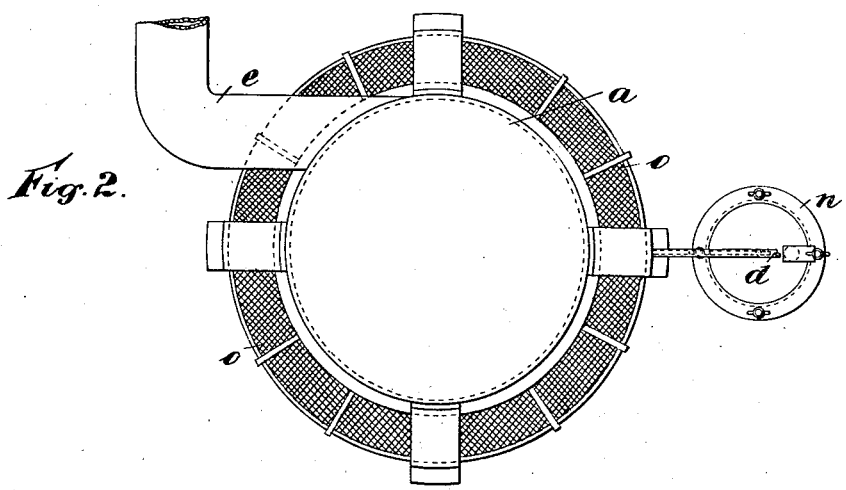

UNITED STATES PATENT OFFICE.

JAMES MECREDY AND DAVID MARC ANDREW GRAHAM HAWES, OF LONDON, ENGLAND.

DESICCATING APPARATUS.

No. 915,303.	Specification of Letters Patent.	Patented March 16, 1909.

Application filed January 15, 1907. Serial No. 352,475.

*To all whom it may concern:*

Be it known that we, JAMES MECREDY and DAVID MARC ANDREW GRAHAM HAWES, both subjects of the King of Great Britain, residing at London, England, have invented a new and useful Improved Desiccating Apparatus, of which the following is a specification.

This invention relates to improved means and apparatus for obtaining dry products from liquids or semi-liquids.

In the processes and apparatuses heretofore employed for the above named purpose certain difficulties have been experienced in producing on a commercial scale a uniformly satisfactory product in a simple, reliable, and efficient manner, and the object of this invention is to overcome these difficulties.

Figure 1 of the accompanying drawing represents diagrammatically in vertical section and Fig. 2 in plan view our improved apparatus for carrying out our present invention.

$a$ is a cylindrical chamber or vessel, into the central and lower part of which the liquid to be treated is introduced under pressure by a pipe $b$ leading from the container $n$ into a spraying or atomizing device $c$ of any suitable construction, cold or heated air being also introduced by the pipe $d$ simultaneously with the liquid. The atomized liquid ascends with force into the space in the central portion of the cylindrical chamber $a$, and ultimately falls outward toward the inner surface thereof, but is prevented from reaching such surface and settling thereon by the following means. In the upper part of the wall of the cylindrical chamber $a$ is fitted a suitably shaped pipe $e$ which also introduces heated air into the chamber but in a tangential direction, so as to cause the said heated air to sweep around and around the inner wall of the vessel in a helical path, thereby covering the said wall with a rapidly moving envelop or surface of heated air which finally escapes from the vessel $a$ by the annular gauze-covered opening $o$ in the lower part thereof. As the atomized liquid falls outward, after having been projected upward in the chamber, it is caught by this rapidly moving envelop or surface of heated air, and instead of being deposited on the stationary wall of the chamber $a$, or falling directly to the bottom thereof, it is whirled around and around, and is thereby not only prevented from reaching the surface of the wall of the chamber and adhering thereto, but is also kept for a much longer period of time in contact with the vortex of heated air as it gradually descends in a helical path toward the bottom of the chamber.

Any suitable means may be provided for separating and collecting the powder, and for allowing the spent air to escape. For example, the powder may be deposited upon the surface of a cone-shaped plate $f$ at the bottom of the apparatus whence it falls into any suitable collecting vessel such as $g$ for example.

Claim.

An apparatus for obtaining dry products from liquids and semi-liquids, comprising a cylindrical chamber having gauze covered openings connecting its lower part with the atmosphere, a device for spraying the liquid upwardly into said chamber, a pipe entering said chamber tangentially at the upper part thereof for delivering air thereto, and powder collecting means in the lower part of the chamber.

In testimony whereof we have signed our names to this specification in the presence of two subscribing witnesses.

JAMES MECREDY.
DAVID MARC ANDREW GRAHAM HAWES.

Witnesses:
H. D. JAMESON,
F. L. RAND.